Nov. 24, 1925.
A. R. MARKS ET AL
MOTOR ROAD VEHICLE
Filed Feb. 27, 1923
2 Sheets-Sheet 1
1,562,901
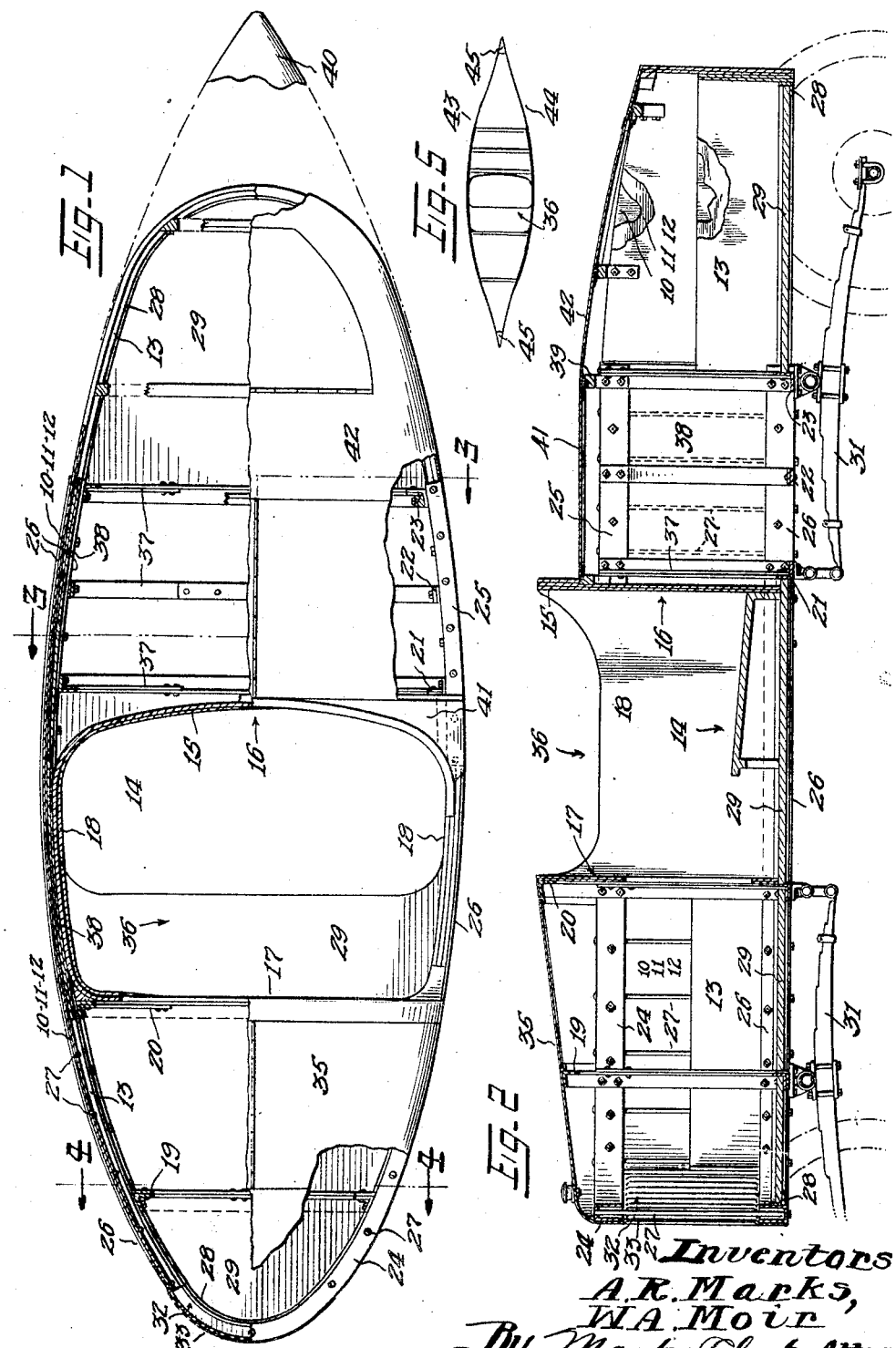
Inventors
A.R. Marks,
W.A. Moir
By Marks & Clerk Attys Nov. 24, 1925.   1,562,901
A. R. MARKS ET AL
MOTOR ROAD VEHICLE
Filed Feb. 27, 1923    2 Sheets-Sheet 2
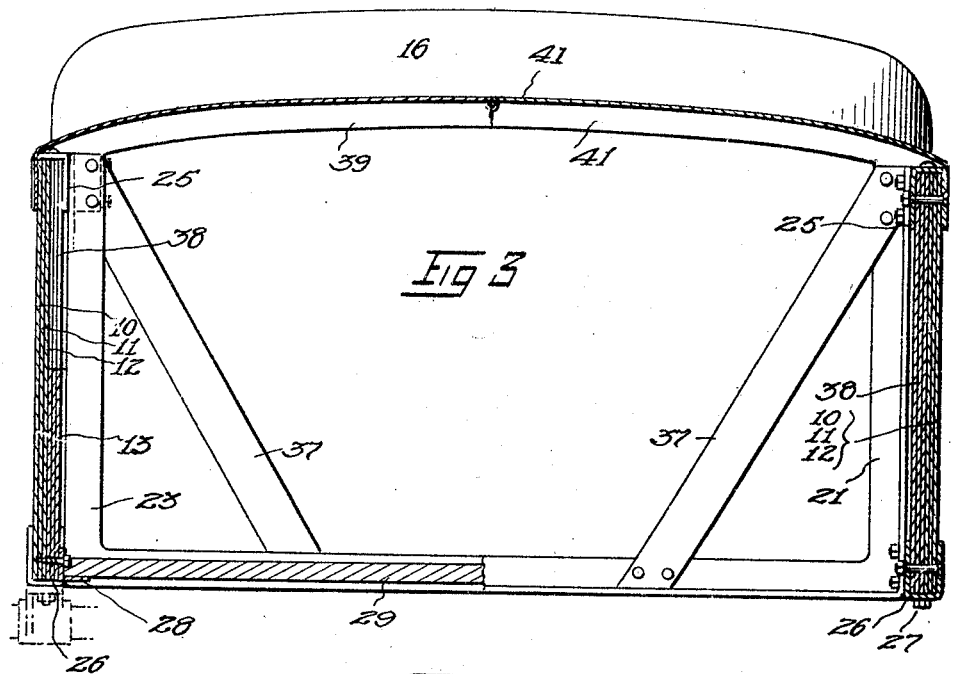
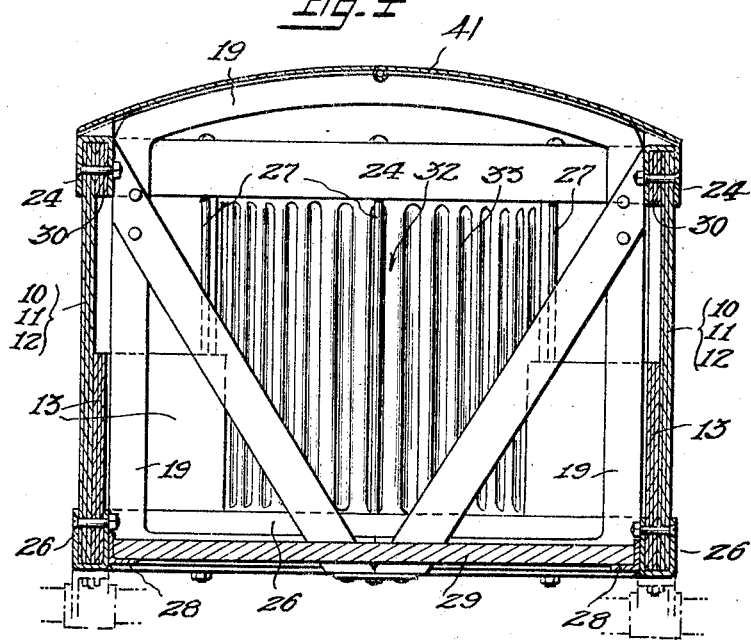
Inventors.
A. R. Marks
W. A. Moir
By Marks & Clerk Attys Patented Nov. 24, 1925.

1,562,901

UNITED STATES PATENT OFFICE.

ARTHUR ROBERT MARKS, OF STRATHFIELD, NEAR SYDNEY, AND WILLIAM ALEXANDER MOIR, OF BURWOOD, NEAR SYDNEY, NEW SOUTH WALES, AUSTRALIA.

MOTOR ROAD VEHICLE.

Application filed February 27, 1923. Serial No. 621,637.

*To all whom it may concern:*

Be it known that we, ARTHUR ROBERT MARKS and WILLIAM ALEXANDER MOIR, subjects of the King of Great Britain and Ireland, residing at Angel Road, Strathfield, near Sydney, and 67 Liverpool Road, Burwood, near Sydney, in the county of Cumberland and State of New South Wales, Australia, have invented certain new and useful Improvements in Motor Road Vehicles, of which the following is a specification.

This invention consists in an improved method of constructing automobiles and bodies therefor. It has been devised with the objects of eliminating frame elements from the chassis and from the body structure, making a self-sustaining body shell of wood or of reinforced wood and utilizing such shell to carry the motive power, the transmission, the wheel suspension and the running elements; thereby minimizing weight, assuring rigidity, diminishing cost and facilitating rapid manufacture.

In carrying out the invention, the body shell is constructed of a plurality of laminæ of ply-boards bent to form a jointless band of appropriate shape and is trussed transversely by an inset curved member of ply-board laminæ glued up on its lateral portions and thus made mechanically continuous with the shell and arranged to form a seat pit. The structure is reinforced forwardly and rearwardly of the seat pit by metal members adapted to suspend the the motive power and transmission elements and to carry the suspension spring mountings. The characteristic of the invention is the forming of the body shell of a band of wood or reinforced wood which is self-sustaining and is adapted to carry all the mechanical elements of the car.

In the accompanying drawings,—

Fig. 1 is a horizontal section through an automobile body constructed according to the present invention, portion of same being shown in top plan;

Fig. 2 is a longitudinal section through same, showing the suspension springs;

Fig. 3 is a transverse section looking forwardly on plane 3—3 Fig. 1;

Fig. 4 is a transverse section looking forwardly on plane 4—4 Fig. 1; and

Fig. 5 is a plan view indicating a method of construction in which the shell band is formed in two sections which are united at the ends to make a continuous band.

A block dummy pattern is constructed in wood or metal to the section of body shell required. Around this block, laminæ of wood which constitute the shell are closely wrapped one over the other, with joints "broken"; each lamina being glued and cramped to the underlying one, thereby to form a continuous band or ring. One or more layers of canvas may be introduced between the wood laminæ, and the outermost "skin" may be of canvas. In practice, plywood is used, as its great strength for weight and resistance to splitting offer substantial advantages as against single wood of adequate thickness, or laminæ of thin wood with the grain running in the same direction, in the respective laminations. In Fig. 2 an extra thicknessing band of wood is shown on the lower part of the shell body. This variation is optional; it is not essential that the main band constituting the body shell should be uniform in thickness from top edge to bottom edge. Determined by the stiffness required, the main shell may consist of two or more laminæ. In practice it is preferred to use three laminations 10—11—12 (see Fig. 3) of plywood, irrespective of the optional stiffening band 13. When a shell thus constructed is set, it is removed from the pattern block, and reinforcements are fitted to it. The primary transverse reinforcement is the structure forming the continuous seat pit 14 which is formed of two or more wood laminæ 15 bent round a former block to the shape of the seat back 16 and the instrument board 17, which latter functions also as a transverse body stay; the lower forward part of this structure is cut away to offer foot room for the occupants of the seat pit. The sides 18 of the seat pit structure set snugly against the shell sides, and are glued thereto to form therewith a unitary structure of great stiffness.

Five transverse frames of T or angle section steel are set into the body shell. Two of these frames 19 and 20 are located forward of the seat pit, and three of them 21—22—23 rearward of the seat pit. They are fixed not directly to the shell body timber but to channel members 24—25—26 which embrace respectively the top edges of the body sides forwardly and rearwardly of the seat pit and the underlying bottom edges of the body sides. The top edge channels 24 and 25 are bolted to the long bottom edge channels 26 by bolts 27 arranged vertically with respect to the wood shell. Angles 28 are riveted to the channels 26 to carry the floor boards 29. If the sides are thickened by an additional lamination of wood 13 around their lower part, filling strips 30 are placed within the top edges of the sides where the top edge channels 24 and 25 embrace them. The long bottom channel member 26 carries the mountings for the suspension springs 31 which may be conveniently disposed on the cantilever system as shown, but may be disposed by the designer according to any other conventional system of suspension. In the forward end of the structure an aperture 32 may be cut away to accommodate a radiator; in this case all edges of the forward portions of the shell around the aperture 32 and above and below it are bound with channel metal or, if so desired, a dummy radiator 33 may be fixed externally on the front end of the body shell to obtain conventional style in the structure. The instrument board portion of the seat inset structure sets up against the metal cross frame 20. The portion of the structure forward of the frame 20 is covered by means of a moulded metal bonnet or decking 35, which may be made and fixed so that it may be lifted off. The cockpit or seat space opening 36 occupies the middle length of the body between the frames 20 and instrument board 17, and the seat back 16, with forward leg room under the instrument board 17 through the frame 20. The rear angle or T frames 21—22—23 support the engine bed. One or more of these frames may be provided with angle braces 37 as may be permitted by the disposition of the engine which may be of any appropriate pattern. Where the transverse frames 21—22—23 are fixed, the shell is reinforced with an additional thickness of three or more layers 38 of wood glued up to the shell wood to form an integral structure therewith. The structure formed of the main shell laminæ 10—11—12 and the reinforcing laminæ 13 and 38 being embraced solidly at top and bottom by the channel members 24—25—26 and the frames 21—22—23 secured to the channel members 24—25—26, the weight of the engine and of the transmission mechanism may be safely carried in the shell structure and the spring suspension mountings may be attached directly to it. The top bridging members 39 of the frames 21—22—23 may be made separately detachable to facilitate access to the engine space, or optionally they may be formed integrally with the bottom and vertical members of those frames. We do not restrict ourselves to the detail of construction of the transverse metal frames or the detail of their attachment through the edging channels to the wood shell structure, provided that the wood shell structure in effect forms a deep rigid continuous band beam.

The rear portion of the shell rearward of the engine and transmission space may be utilized as storage space for freight or gear, and a dummy end such as 40 may be planted on to it externally to form a finish of any desired shape. The engine space is without a floor, but an under-pan (not shown) is provided to prevent intrusion of dust upwardly from the road. The top of the shell space immediately rearwardly of the seat back 16 is covered with a fixed decking 41 which forms a further transverse reinforcement. Rearwardly of this decking 41 the shell is covered by a removable top or beetle back structure 42 provided with means for holding it securely in place. Hatch doors for access to the space below it may be provided in this decking. It is to be understood that the shell may be moulded under pressure to obtain a belled side effect instead of a flat side effect in the external appearance of the shell.

The method of construction indicated in Fig. 5 offers a certain simplification in construction. The shell is in this case constructed in separate halves 43 and 44 which are respectively bent to form the two sides of the body and are secured together at the ends over "deadwood" blocks 45 to produce a continuous band shaped to angular finish at the ends.

Though the structure has been designed to enable the building of the mechanical elements of an automobile into a light but rigid body of wood or of reinforced wood and thus to dispense with a chassis frame, it is to be understood that bodies constructed on the method described may be fitted on chassis having frames of conventional type, appropriate modification of the transverse frames being made in this case to accommodate the body to the chassis frame and the chassis mechanism.

The vertical through bolts which connect the top and bottom channels may be taken up on their nuts to tighten the structure if looseness should develop as a result of shrinkage in the wood shell members.

What we claim as our invention and desire to secure by Letters Patent is:—

1. In a vehicle of the character described, a body shell constructed of a continuous band of ply-wood laminæ, a bottom connected with the shell, a seat pit constructed of a continuous band of ply-wood laminæ arranged transversely and medially of the shell acting as a brace for the shell.

2. An arrangement as claimed in claim 1, wherein metal frames are fixed transversely to said shell and are adapted to carry motive power, steering gear, wheel suspension and other chassis members.

3. A frameless automobile body which is especially adapted to carry the elements of the chassis frame consisting of an oblong band, a transverse member centrally arranged therein constituting a seat frame, channel metal bindings on the top of the edges of the lateral parts of the band, and rectangular metal frames hung on said channels and inset within said band and adapted to stiffen it laterally and adapted to carry the motive power and other machine elements.

4. A frameless automobile body which is structurally adapted to carry the chassis elements without a chassis frame, and which consists of a continuous shaped band a transverse member centrally therein all constructed in plywood laminæ, said transverse member constituting a seat frame; plywood laminæ reinforcements fixed integrally on the sides of said body; channel metal bindings on the top and bottom edges of the lateral parts of said band, and rectangular metal frames hung on said channels and inset within said shaped band and adapted to stiffen it laterally and to carry the motive power, steering, wheel suspension, and other machine elements.

In testimony whereof we affix our signatures.

ARTHUR ROBERT MARKS.
WILLIAM ALEXANDER MOIR.